May 1, 1945.         C. D. RYAN         2,374,839
CLUTCH
Original Filed April 29, 1940
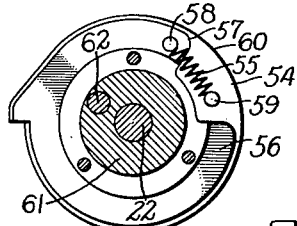
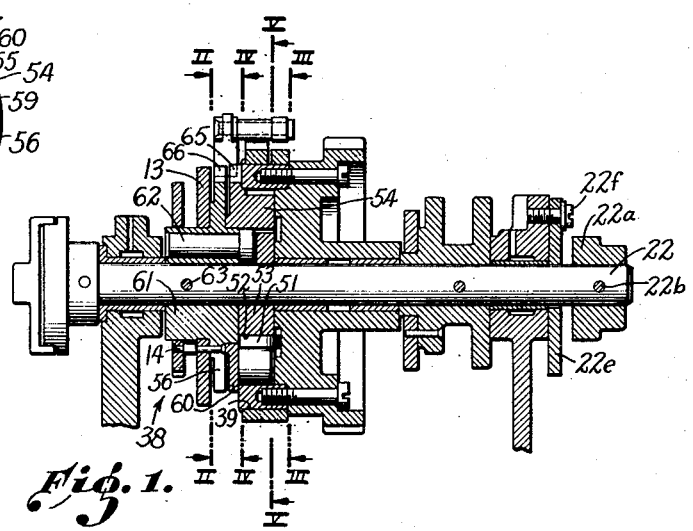
Fig. 2.
Fig. 1.
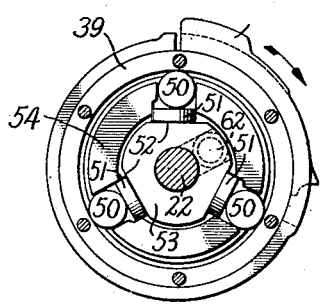
Fig. 3.
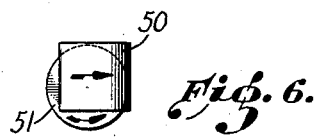
Fig. 6.
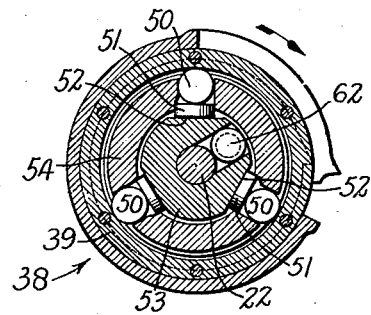
Fig. 5.
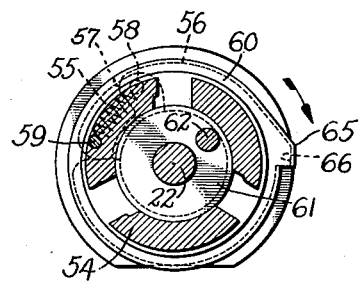
Fig. 4.
INVENTOR
Commodore D. Ryan
BY
Blair, Curtis + Hayward
ATTORNEYS.

Patented May 1, 1945

2,374,839

UNITED STATES PATENT OFFICE 2,374,839

CLUTCH

Commodore D. Ryan, Los Angeles, Calif., assignor to Commercial Controls Corporation, a corporation of Delaware Original application April 29, 1940, Serial No. 332,305. Divided and this application July 8, 1942, Serial No. 450,155

1 Claim. (Cl. 192—45)

This invention relates to a clutch mechanism and more particularly to an overrunning clutch.

One of the objects of this invention is to provide a sturdy and efficient clutch capable of a variety of uses and particularly adapted to cyclical operation of one rotation per cycle. Another object is to provide an overrunning clutch incorporating bearing and wedging elements having high wear resistance qualities. Another object is to provide an overrunning clutch having wedging elements which are adapted to engage at different portions each time the clutch is engaged. Another object is to provide a clutch of the above nature which is compact and easy to install. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claim.

This application is a division of the application of Frank P. Sager, Ernest R. Bergmark, Commodore D. Ryan and Herschel L. Atherton, Serial No. 332,305, filed April 29, 1940.

In the drawing,

Figure 1 is a fragmental sectional view of the clutch and its attached parts.

Figure 2 is a sectional view taken substantially in the plane of line 2—2 of Figure 1;

Figure 3 is a sectional view taken substantially in the plane of line 3—3 of Figure 1;

Figure 4 is a sectional view taken substantially in the plane of line 4—4 of Figure 1;

Figure 5 is a sectional view taken substantially in the plane of line 5—5 of Figure 1; and Figure 6 is a plan view of one of the wedging elements and its bearing disc to illustrate the offset relation of these parts.

Similar reference characters refer to similar parts throughout the several views of the drawing.

With reference to Figure 1 my clutch is generally indicated at 38 and includes three equally spaced clutch rollers 50 (Figures 3, 5, 6) acting between the inner periphery of driving clutch ring 39 (Figure 5) and bearing discs 51 which discs are freely seated upon the wedging surfaces 52 formed on the driven member 53 of the clutch. A roller retaining member 54 (Figure 3) is provided to control the position of the clutch rollers 50 with relation to the wedge surfaces 52 formed on the clutch driven member 53 and to thereby control the engagement and release of the clutch.

The clutch roller discs 51 are mounted in offset relation with respect to rollers 50 as shown most clearly in Figure 6 to cause a slight rotation of these discs each time the clutch is engaged. The rotation of discs 51 with the engagement of the clutch presents a new surface against which the rollers will wedge each time the clutch is engaged, thereby reducing the wear on the discs and preventing the rollers from seating in. As a further advantage in this arrangement, the discs 51 may be formed of high quality hardened steel and transmit the driving force to the wedge surfaces 52 of the driving member through a relatively large surface of contact, thereby greatly prolonging the life of this member.

The release and engagement of the clutch is controlled by rotating the roller retaining member 54 with respect to the clutch driven member 53. A clutch spring 55 (Figure 2) acts to urge the roller retaining member 54 in a clockwise direction as viewed in Figures 3 and 5 to advance the rollers and discs outwardly along the wedge surfaces of the driven member until the rollers enter into wedging engagement with the inner periphery of clutch ring 39. To provide the necessary room for clutch spring 55, flange 56 is cut away in the manner illustrated at 57 in Figures 2 and 4 and flange 56 is provided with a spring pin 58 extending from its side face to which one end of spring 55 is secured. The opposite end of spring 55 is connected to the spring pin 59 extending from the side face of the roller retaining member flange 60. As previously pointed out, the clutch spring acts between the driven member 53 (Figure 5) and the roller retaining member 54 to continuously urge the rollers into driving engagement with the clutch ring 39. The resistance of the mechanism driven by the clutch governs the wedging action of the rollers during the driving operation. The driven member 53 is connected to hub 61 of flange 56 by means of a headed driving pin 62 as shown in Figures 1–5 inclusive, and the hub is in turn keyed to the main drive shaft 22 by means of a taper pin 63 (Figure 1).

The driving clutch is normally maintained disengaged by means of a clutch control lever 26 which engages a stop lug 65 (Figure 4) formed on the periphery of the roller retaining member flange 60. By this engagement the roller retaining member 54 is stopped in its rotation, releasing the clutch rollers from their wedging engagement with the clutch driving ring 39. A stop lug 66 is formed on the periphery of flange 56 and may be engaged by the clutch control lever as desired to stop the rotation of the clutch and mechanism driven thereby.

Means are provided to prevent reverse rotation of flange 56 when the clutch is disengaged and this means (Figure 1) may include a stop disc 22a secured upon the rear end of shaft 22 by means of taper pin 22b. The stop disc is provided with a stop shoulder (not shown) which shoulder is engaged by the free end of a stop pawl (not shown). This mechanism which prevents reverse rotation of flange 56 when the clutch is disengaged is shown and described in detail in the above-noted Sager et al. application.

The clutch will remain in its disengaged condition as long as the stop lugs 65 and 66 (Figure 4) are held against rotation by the clutch control lever. The disengagement of the control lever from the stop lugs 65 and 66 will permit the clutch spring 55 (Figure 2) to advance the roller retaining member 54 and to thereby return the clutch rollers into wedging engagement with the clutch driving ring 39, in the manner previously described to drive the machine through a complete cycle of operation. Upon the completion of this cycle of operation the stop lugs 65 and 66 (Figure 1) will again contact the clutch control lever to disengage the clutch and stop the driven mechanism of the machine.

It will thus appear that I have provided a clutch capable of fulfilling the several objects noted hereinabove in a thoroughly practical and efficient manner.

As many possible embodiments may be made of the above invention and as many changes might be made in the embodiment above set forth, it is to be understood that all matter hereinbefore set forth, or shown in the accompanying drawing, is to be interpreted as illustrated and not in a limiting sense.

I claim:

In an overrunning clutch, in combination, a driving member, a driven member, said driven member having a wedging surface formed thereon which surface is flat and lies in a plane parallel to the axis of rotation of said driven member, a wedging roller disposed between said members adjacent said wedging surface, and a bearing disc freely disposed between and in engagement with said wedging surface and said wedging roller, said wedging roller and said bearing disc being arranged in off center relationship whereby rotation of said roller rotates said disc.

COMMODORE D. RYAN.